Aug. 20, 1957     E. D'LUZANSKY     2,803,723
ADJUSTABLE THERMOSTATIC SWITCH
Filed Oct. 10, 1955
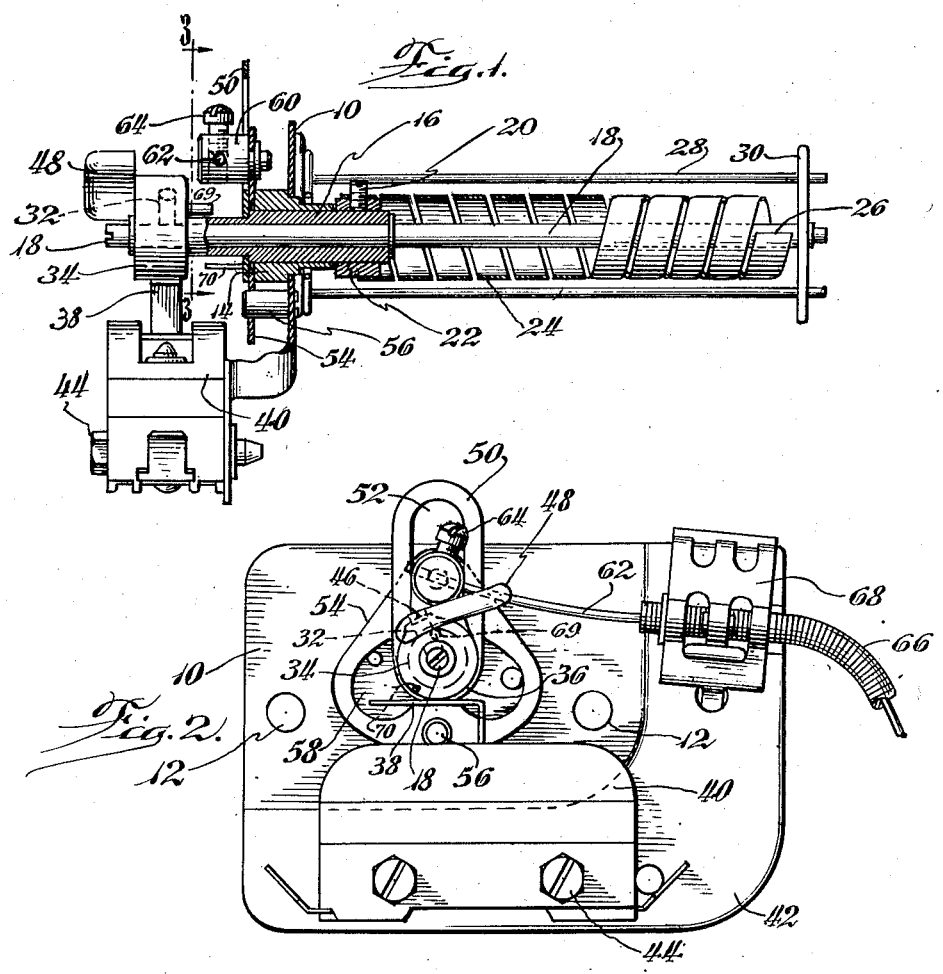
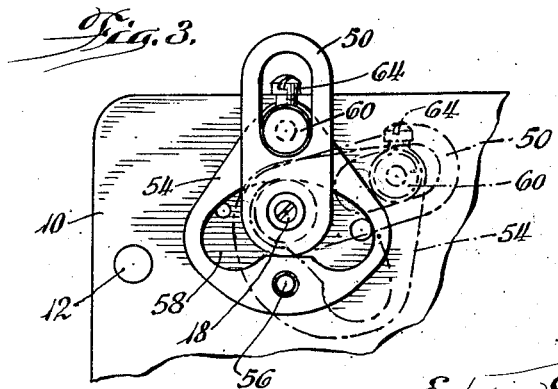
Inventor:
Edgar D'Luzansky
By Ahlberg, Kupper & Gradolph
Attorneys United States Patent Office 2,803,723
Patented Aug. 20, 1957

2,803,723

ADJUSTABLE THERMOSTATIC SWITCH

Edgar D'Luzansky, Indianapolis, Ind., assignor to Stewart-Warner Corporation, Chicago, Ill., a corporation of Virginia Application October 10, 1955, Serial No. 539,317

4 Claims. (Cl. 200—138)

The present invention relates to adjustable thermostatic switches.

One of the objects of my invention is to provide a novel adjustable bimetal actuated switch for use where the switch makes or breaks an electric circuit depending upon the temperature of the bimetal sensitive element thereof.

An additional object is to provide a novel thermostatic switch of the above character which is well adapted to be set to respond at a desired temperature and in which the setting may readily be made from a remote location.

Still another object is to provide a novel thermostatic switch of this type which is readily adaptable for setting to a desired temperature through the use of a Bowden wire type control.

Still another object is to provide a switch of the character recited above in which a spiral thermostatic element therein can be set by means of a Bowden wire control through an extremely wide range of angular settings.

Still another object is to accomplish the above at a low cost.

Other objects and advantages will become apparent from the following description of a preferred embodiment of my invention which is illustrated in the accompanying drawings.

In the drawings, in which similar characters of reference refer to similar parts throughout the several views:

Fig. 1 is a side view of a thermostatic switch embodying features of the present invention, with portions of the mechanism broken away to reveal details of construction in longitudinal medial section;

Fig. 2 is an end view of the thermostatic switch of Fig. 1; and

Fig. 3 may be considered as a fractional sectional view taken in the direction of the arrows substantially along the line 3—3 of Fig. 1.

The present invention is illustrated in a thermostatic switch of the type which is arranged to be sensitive to the air temperature in a hot air ventilating duct for instance, and which is adapted to regulate the temperature of the air passing through the duct so as to maintain it substantially constant. As an example, the copending application of Frank A. Ryder, for "Automotive Vehicle Heating System," Serial No. 526,714, filed August 5, 1955, illustrates a vehicle heating system in which the temperature in a hot air duct is maintained at a desired level by turning on or shutting off the fuel to the heater burner, depending upon whether the temperature of the air in the duct respectively falls below or rises above the preselected level. The thermostatic switch illustrated in the accompanying drawings may be considered as being particularly adapted to be used as the control in such a heating system. Other uses for the switch will, of course, be evident.

Referring to Fig. 1 of the drawings, the thermostatic switch there shown has its several operating elements attached to a plate 10 provided with holes 12 which are for the purpose of mounting the thermostat in an appropriate location. A bearing bushing 14 is secured through an opening in the plate 10 as by staking, and this bushing serves to journal a sleeve or quill shaft 16 which in turn journals a smaller diameter shaft 18. To the right of the plate 10, as seen in Fig. 1, the quill shaft 16 is secured by a setscrew 20 to a collar 22 connected to one end of a spiral thermostatic bimetal element 24. This element extends toward the right and its opposite end is bent inwardly and fixed to the end of the central shaft 18 as at 26.

In order to protect the bimetal element and shaft 18 against damage, three rods 28 have their ends secured through the plate 10 and extend in parallel relationship to the bimetal element 24. These rods 28 are equally spaced angularly and are connected together at their free ends by a ring 30. The three rods 28 and the ring 30 therefor form an open cage around the thermostatic element 24.

To the left of the plate 10, as seen in Fig. 1, the central shaft 18 is secured by a setscrew 32 to a cam 34 which may conveniently be molded of a thermoplastic material such as nylon, for instance. As will be seen in Fig. 2, the major portion of the edge surface of this cam is cylindrical and concentric with the shaft 18 as is indicated at 36 and rests against the operating lever 38 of a precision type snap-switch 40. This switch is of a well known type and is secured to an outwardly offset lower portion 42 of the plate 10 by means of screws 44. The position of the switch 40 is such that when the cylindrical portion 36 of the cam 34 is against the lever 38, the circuit through the switch 40 is in its normal condition such as the closed condition of a normally closed switch. In a heater system of the type previously mentioned, this would open the fuel valve and the heater would be on. However, when the cam 34 is rotated to such a position that a raised portion 46 extending to a somewhat greater radius than the portion 36 is brought against the lever 38, the lever will be depressed slightly, thereby snapping the contacts of the switch 40 to the alternative position, such as the open condition for a normally closed switch, for instance. This, in the example given, would turn the heater off. In order to prevent excessive rotation of the cam 34, an outwardly extending finger or wing 48 may be molded as a portion of the cam so as to have a length such that it is brought against the top of the housing for the switch 40, thereby preventing rotation of the cam 34 in either direction beyond its normal range of movement.

From the above it will be seen that when the shaft 18 is rotated almost as far as it will go in a counterclockwise direction as seen in Fig. 2, the switch 40 will be open (assuming it is a normally closed switch) whereas, in all other angular positions of the shaft 18 the switch will be closed.

A lever 50 is formed of sheet metal stock and is secured at one end to the quill shaft 16 in a position slightly to the left of the end of the bushing 14 as seen in Fig. 1. This lever extends generally upwardly and is formed to provide a longitudinally extending slot 52 of uniform width therein.

A second lever 54 formed of sheet stock has its lower end pivoted to a pin 56 secured in the plate 10 in a position somewhat below the bushing 14. The lever 54 lies in a position between the bushing 14 and lever 50 and is formed to provide an arcuate slot to clear the bushing 16. This slot has sufficient length so that the lever 54 may be swung from side to side about the pivot 56 throughout an angularity of about 90 degrees.

At its upper end the lever 54 is pivoted to an outwardly extending cylindrical member 60 which extends through and loosely fits the slot 52 from side to side. Outwardly of the lever 52 the cylindrical member 60 is drilled to permit the passage of the free end of the inner member 62 of a Bowden wire, the end of the wire being retained in place by means of a setscrew 64. The sheath of the Bowden wire, which is indicated at 66, is fixed in position against the face of the plate 10 by a clamp fitting 68.

As the control knob or lever, which governs the position of the Bowden wire inner member 62, is moved so as to extend or retract the wire 62 with respect to the sheath 66, such action moves the cylindrical member 60 and lever 54 from side to side. This pivoting action takes place about the pin 56 as a center of rotation. Movement of the cylindrical member 60 in the arcuate manner as described causes the lever 50 to be swung from side to side with the quill shaft 16 serving as the center of rotation. Inasmuch as the quill shaft is well above the pin 56, the lever 50 will be swung from side to side throughout something of the order of 145 degrees of rotation, even though the cylindrical member 60 connected to the Bowden wire is swung through a much smaller arc, of the order of 90 degrees. The result of this is that the free end of the Bowden wire inner member 62 is not bent upwardly and downwardly nearly as much as it would be if it were connected directly to the lever 50 and an attempt were made to swing this lever through anything of the order of 145 degrees of movement. Furthermore, since the angular range of movement of the lever 54 from one end of its stroke to the other is relatively small, the effort to pull or push the inner member 62 of the Bowden wire is substantially constant throughout the range of movement. Furthermore, it is not possible for the connection between the Bowden wire 62 and its movable point of attachment to get into a dead center relationship with the end of the sheath 66 which would render the device inoperative.

If, for example, the Bowden wire is pulled to the phantom line position of Fig. 3 so as to move the cylindrical member 60 toward the right, thereby swinging the lever 54 in that direction and the lever 50 through a considerably greater arc in the same direction, the quill shaft 16 will be rotated in a clockwise direction, as seen in Fig. 2, thereby rotating the fixed end of the bimetal element 24 in the same direction. This of course rotates the free end of the bimetal element at 26 and also the shaft 18 and cam 34.

If such rotation is sufficient to bring the cylindrical portion 36 of the cam into engagement with the lever 38, a circuit will be made through the switch 40 (assuming that this switch is of the normally closed type) thereby typically starting a heater burner connected thereto into operation. As the temperature of the air in the duct rises, thereby heating the bimetal element 24 to a higher temperature, the spiral bimetal element 24 will twist somewhat more tightly and rotate the shaft 26 in a counterclockwise direction, as seen in Fig. 2, with respect to the quill shaft 16. This moves the cam 34 and eventually depresses the switch lever 38 and causes the switch 40 to open the fuel circuit to the heater. This cycle is of course repeated endlessly.

Thus, regardless of the position of the Bowden wire inner member 62, and hence the position of the levers 54 and 50, the cam 34 will always be moved backwardly and forwardly in a cyclic fashion so as to depress or release the switch lever 38 as required to maintain any desired temperature which is fixed by the position to which the Bowden wire 62 is manually set.

If it is desired to put the thermostatic control out of operation so that the heater burner, for instance, operates constantly, it is necessary merely to provide a pair of interengaging projections 69 and 70 on the back of the cam 34 and on the lever 50, respectively, as is best seen in Fig. 1. These projections are so positioned that when the Bowden wire inner member 62 is pulled out to the limit of its travel, these projections will be engaged and the cam will be prevented from rotating far enough in a counterclockwise direction to depress the switch lever 38. The switch is thus kept closed until the Bowden wire control is readjusted.

Inasmuch as the sensitivity of a thermostatic switch of this general character (for any certain degree of torque developed by the bimetal element) depends upon the angular displacement of the free end of the bimetal element with any certain amount of temperature change, it will be appreciated that it is a great advantage to have the adjustable fixed end of the bimetal element movable throughout a far greater degree of angularity (as is provided by the present invention) than is possible to obtain with a direct attachment of the Bowden wire to a lever fixed to the bimetal coil. The thermostatic switch described above, therefore, has a degree of sensitivity over a wide temperature range of adjustment beyond what is ordinarily accomplishable by prior switches of this general character.

From a consideration of the above description of a preferred embodiment of my invention it will be appreciated that variations and substitutions may be made in the mechanism shown and described without departing from the scope or spirit of the invention and that the scope of the invention is, therefore, to be measured by the scope of the following claims.

Having described my invention, what I claim as new and useful and desire to secure by Letters Patent of the United States is:

1. In a thermostatic device, a coiled bimetal actuator, an electric switch, means secured to one end of said bimetal actuator for operating said switch when said end is rotated to a certain position, a member journaled for rotation, said member being connected to the other end of said bimetal actuator, a lever secured at one end to said member, said lever having a slot therein extending generally radially with respect to said member, a second lever having an element thereon engaging said slot, said second lever being pivoted for swinging movement about a center of rotation offset with respect to said member in a direction generally away from the central position of said element such that the center of rotation of said member is between said second lever pivot and said element, and means for manually setting the angular position of said second lever.

2. In a thermostatic device, a coiled bimetal actuator, an operated member, means secured to one end of said bimetal actuator for operating said operated member when said end is rotated to a certain position, a member journaled for rotation, said member being connected to the other end of said bimetal actuator, a lever secured at one end to said member and extending generally radially with respect to said member, a second lever, an element interengaging said levers at a position offset with respect to said member, said second lever being pivoted for swinging movement about a center of rotation offset with respect to said member in a direction generally farther away from said element than is said center of rotation of said member when said element, said member, and said center of rotation of said second lever are in substantially a straight line, and means for manually setting the angular position of said second lever.

3. In a thermostatic device, a coiled bimetal actuator, an electric switch, means secured to one end of said bimetal actuator for operating said switch when said end is rotated to a certain position, a member journaled for rotation, said member being connected to the other end of said bimetal actuator, an element adapted to pivot about a center of rotation, said element engaging said member at a position eccentric with respect to said journal so as to swing said member about said journal as said element is pivoted about said center of rotation, the distance between said center of rotation and said point of engagement being greater than the distance betwen said journal and said point of engagement, and means for manually setting the angular position of said element.

4. In a thermostatic device, a coiled bimetal actuator, means secured to one end of said bimetal actuator for rotation by said actuator, a member journaled for rotation, said member being connected to the other end of said bimetal actuator, an element adapted to pivot about a center of rotation, said element engaging said member at a position eccentric with respect to said journal so as to swing said member about said journal as said element is pivoted about said center of rotation, the distance between said center of rotation and said point of engagement being greater than the distance between said journal and said point of engagement, and Bowden wire means for manually setting the angular position of said element.

References Cited in the file of this patent

UNITED STATES PATENTS

| | | |
|---|---|---|
| 2,084,574 | Cummings | June 22, 1937 |
| 2,490,073 | Malone | Dec. 6, 1949 |